United States Patent [19]

Henry et al.

[11] 4,235,355

[45] Nov. 25, 1980

[54] DEVICE FOR CARRYING SHEET OR PANEL MATERIAL

[76] Inventors: David G. Henry; Karen A. Paulsen, both of 167 McKendry Dr., Menlo Park, Calif. 94025

[21] Appl. No.: 955,463

[22] Filed: Oct. 27, 1978

[51] Int. Cl.³ .............................................. B65D 71/00
[52] U.S. Cl. ..................................... 224/45 P; 294/74
[58] Field of Search ............. 224/58, 49, 45 M, 45 H, 224/45 F, 45 P, 45 Q, 45 S, 55, 52; 294/74, 67 R, 67 A, 27 R, 67 EA, 67 E, DIG. 1, 32, 6; 206/449, 454, 453; 211/41; 248/310, 311.1 R, 300, 309 R, 346, 360

[56] References Cited

U.S. PATENT DOCUMENTS

| | | | |
|---|---|---|---|
| 1,506,665 | 8/1924 | Pray | 294/74 |
| 1,954,567 | 4/1934 | Harding | 206/453 |
| 2,135,225 | 11/1938 | Sladky | 224/45 P |
| 2,198,244 | 4/1940 | Chapman | 224/45 P |
| 2,676,835 | 4/1954 | McKinney | 294/74 |
| 3,350,129 | 10/1967 | Novak | 294/74 |
| 4,002,277 | 1/1977 | Westerholm | 224/455 |

*Primary Examiner*—Robert J. Spar
*Assistant Examiner*—Kenneth Noland
*Attorney, Agent, or Firm*—Paul L. Hickman

[57] ABSTRACT

A device for carrying large sheets of material (such as plywood or gypsum wallboard) both efficiently and without damage. The device includes a pair of brackets for engaging the two lower corners of a sheet of material and a flexible line connecting the pair of brackets. A person wishing to lift and carry the material grasps the flexible line and exerts an upward force thereupon to lift the material off the ground.

7 Claims, 5 Drawing Figures

DEVICE FOR CARRYING SHEET OR PANEL MATERIAL

BACKGROUND OF THE INVENTION

1. Field of the Invention

This invention relates generally to carriers and more particularly to devices adapted to carry large sheets of material, such as four foot by eight foot sheets of plywood or gypsum wallboard.

2. Description of the Prior Art

It is difficult for one person to single-handedly carry a sheet of plywood or gypsum wallboard because of the typically large dimensions of those materials. In recognition of this problem, various individuals have invented devices which make it substantially easier for a single person to carry large sheets of material.

One such invention is disclosed in U.S. Pat. No. 2,430,142 of S. C. Roberts. In his patent, Roberts teaches a device including an adjustable framework forming a lip at one end and forming a handle at the other end. When the lip of the device is hooked around an edge of a large sheet of material, the material can be lifted by exerting an upward force on the handle of the device.

In U.S. Pat. No. 2,651,441, R. S. Rau et al disclose a device including a substantially L-shaped member that is clipped onto a body harness. The L-shaped member engages the lower edge of a sheet of material so that the weight of the material is supported by the body harness.

M. I. Masterson, Jr., in U.S. Pat. No. 3,203,606, discloses a device for carrying wallboard including an elongated rod having a handle attached at a first end and a projecting plate attached to the other end. To use the device, a person grasps the handle in his hand, slips the plate beneath the lower edge of the wallboard and then lifts upwardly with the handle to pick up and then carry the wallboard.

Note that all of the aforementioned devices have a member that in some way engages the bottom edge of a sheet of material so that the material can then be lifted. The next two patents to be discussed, namely U.S. Pat. No. 3,524,670 of R. Ilich and U.S. Pat. No. 4,013,202 of H. Russo, operate on an entirely different principle, i.e., they both disclose devices that engage a sheet of material by compressively clamping members to the sides of the material.

Ilich's patent discloses a device that includes an inverted, J-shaped rod provided with a handle at its longer end and having a facing pair of gripping plates positioned within the curved portion proximate its other end. When an upward force is exerted on the handle, a linkage rod that couples the handle to the gripping plates forces the plates tightly together to firmly clamp the device to the sheet of material.

Russo's patent discloses a device including a base frame, a gripping frame pivotally attached to the base frame, and a pair of cams attached to the gripping frame. When a sheet of material is placed between the two frames and an upward force is exerted on the gripping frame, the cams tightly press the sheet of material against the base frame so as to clamp the device to the material and allow it to be lifted.

A problem not fully addressed by the prior art is how to design a device for carrying large sheets of material that will not allow the sheet of material to slip and possibly fall. For example, in the first three patents cited the members engaging the lower edge of a sheet of material could slip along or slip off that edge, thus allowing the sheet of material to fall to the ground. In the last two patents cited, should pressure be relaxed on either of the devices, even momentarily, the sheet of material would no longer be tightly clamped and it too could slip or fall.

A further problem that is not addressed by the prior art is how to design a carrying device that will not damage fragile sheets of material, such as plaster-filled wallboard (sometimes known as SHEETROCK TM). For instance, the wire framework of Robert's invention could cut the edges or the gripping members of Ilich's or Russo's inventions could dent the sides of a sheet of soft wallboard.

SUMMARY OF THE INVENTION

It is an object of this invention to provide a device for carrying large sheets of material by one person which, under normal circumstances, will not let a sheet of material slip and possibly fall to the ground.

Another object of this invention is to provide such a device which furthermore will not damage fragile sheets of material, such as gypsum wallboard.

Yet a further object of this invention is to provide a device as described above which is inexpensive to manufacture and easy to use.

Briefly, the invention comprises a first bracket for engaging a first corner of a sheet of material, a second bracket for engaging a second corner of a sheet of material, and a rope or other flexible line loosely attaching the first and second brackets together. When the brackets are engaged with the corners, the material may be lifted by one person by grasping the rope and exerting an upward force thereupon. The brackets are configured so as to present no sharp edges and so as to evenly distribute forces in order to prevent damage to soft materials. An optional handle may be attached to the rope to make it easier to grasp.

An advantage of this invention is that a sheet of material may be supported at two opposing corners, making it very unlikely that the device would slip or fall off the material.

A further advantage of this invention is that the configuration of the brackets of the device are such that damage to a soft sheet of material is minimized.

Another advantage of this invention is that it allows one person to carry the sheet material without assistance.

These and other objects and advantages of the present invention will no doubt become apparent to those skilled in the art after having read the following detailed description as accompanied by the several figures of the drawing.

DETAILED DESCRIPTION OF A PREFERRED EMBODIMENT

Figure 1:
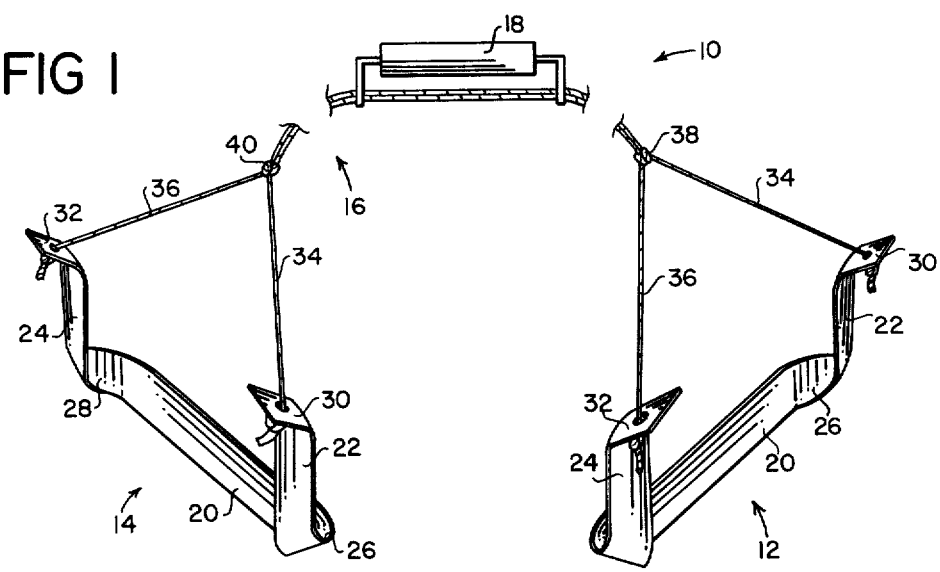
FIG. 1 is a perspective view of a device for carrying a large sheet of material in accordance with the present invention.
Figure 2:
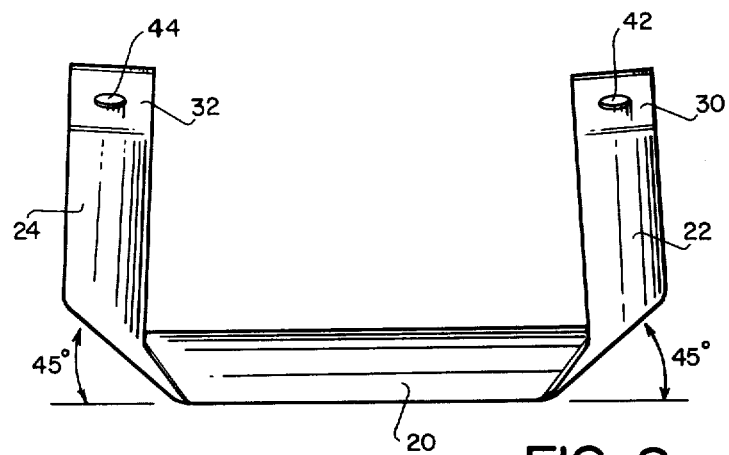
FIG. 2 is a front elevational view of one of the corner brackets shown in FIG. 1.
Figure 3:
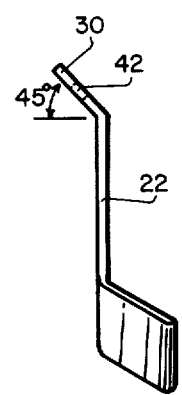
FIG. 3 is a side elevational view of the corner bracket shown in FIG. 2.
Figure 4:
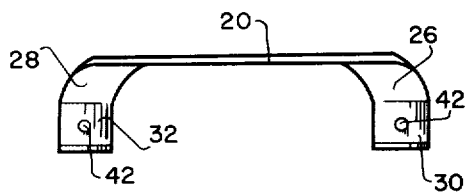
FIG. 4 is a top plan view of the corner bracket shown in FIGS. 2 and 3.

Referring to FIG. 1, a device 10 for carrying large sheets of material includes a first corner bracket 12, a second corner bracket 14, a flexible line 16 connecting the two corner brackets, and a handle 18 loosely coupled to the line. Referring now additionally to FIGS. 2, 3 and 4, a corner bracket can be seen to include a length of material that is formed into a generally U-like shape having a base portion 20 and two depending leg portions 22 and 24. In this preferred embodiment, base portion 20 is bent out of the plane defined by leg portions 22 and 24 so as to form sections of the base into a pair of seating surfaces 26 and 28. The seating surfaces thus formed should be at substantially right angles to one another, as indicated in FIG. 2, so that they are parallel to the side edges of a sheet of material when placed over a corner.

Also in this preferred embodiment, the free ends 30 and 32 of leg portions 22 and 24, respectively, are bent out of the imaginary plane defined by the rest of the leg portions in a direction opposing the bend of the base portion. The angle at which both ends 30 and 32 are bent is approximately 45° with respect to that imaginary plane.

In this embodiment, the flexible line is actually formed from a pair of ropes 34 and 36 which are knotted together at 38 and 40. The ends of rope 34 are each threaded through a hole 42 formed through an end 30 of one of the brackets and then knotted, and the ends of rope 36 are each threaded through a hole 44 formed through an end 32 of one of the brackets and then likewise knotted. When attached in this manner, flexible line 16 forms a loose connection between the two corner brackets.

Handle 18 is preferably slidably coupled to flexible line 16 so that it can fairly freely slip along the line. The actual handle design may be one of several well known types and need not be limited to the type depicted in FIG. 1.

Figure 5:
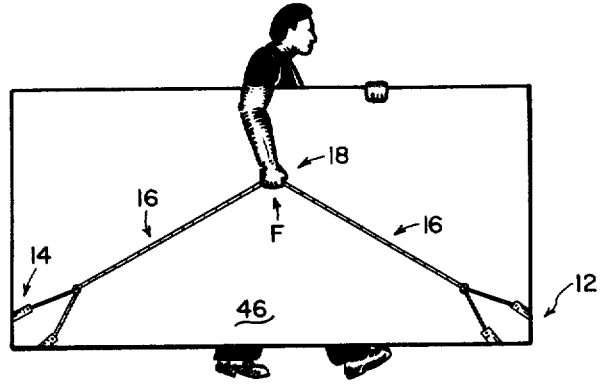
FIG. 5 illustrates the use of the device of the present invention.

As shown in FIG. 5, a sheet of material 46 can be lifted by placing corner bracket 12 over a first lower corner of the material, placing corner bracket 14 over a second lower corner of the material, grasping the handle 18 with the hand, and exerting an upward force F upon the flexible line 16. The person's other hand preferably rests along the upper edge of the sheet of material to steady and guide the material as it is being carried, although the device is stable enough that the free hand may be used to open doors, etc.

The corner brackets are designed so as to minimize the possibility of marring or damaging soft sheets of material, such as the aforementioned SHEETROCK TM. The seating surfaces 26 and 28 are angled so that they will lie flat along the edges of the sheet of material and are wide enough to accept one or more standard thicknesses of wallboard or plywood. Furthermore, the ends 30 and 32 of the bracket are bent outwardly so that the ropes will not dig into the sides of material 46.

The end brackets can easily and inexpensively be formed from a single, flat strip of material. For instance, a strip of thermoplastic material about 1¼ inches wide, 18 inches long and ⅛ inch thick can be heated and bent to shape around a proper mold. The corner brackets could also be injection molded in the desired shape. Furthermore, other materials may be even more suitable for constructing the bracket member. An example of this would be a relatively heavy gauge galvanized steel plate which could be cut or punched to length and then bent or swagged into shape using techniques well-known to those skilled in the art.

Flexible line 16 can be formed from any strong, flexible material, such as rope, twine, wire or cable. The actual manner in which the flexible line is attached to the corner brackets is not critical and could take several alternative forms, such as a continuous loop of rope running through one or more holes in the end of the brackets.

Furthermore, a handle, such as handle 18, is not absolutely necessary to this invention. If the handle is omitted, however, it would be advisable for a person using the device to wear gloves as protection against rope cuts or burns.

While this invention has been described in terms of a single preferred embodiment, it is contemplated that various alterations and modifications thereof will become apparent to those skilled in the art after they have read the preceding detailed description. For instance, the corner brackets could be configured in any one of a multiplicity of shapes suitable for engagement with a corner of a sheet of material. It is therefore intended that the following appended claims be interpreted as including all such alterations and modifications as fall within the true spirit and scope of the present invention.

What is claimed is:

1. A device for carrying sheet material comprising:
   a pair of bracket means for engaging the two lower corners of a sheet of material, each bracket means including
      a flat, continuous, elongated strip of material formed into a generally U-like shape having a base portion, two depending and spaced apart leg portions, and two seating portions defining a pair of seating surfaces, said two seating portions being located between said base portion and a respective one of said leg portions,
   said base portion extending between and adjoining said two seating portions,
   said base portion being bent out of an imaginary plane defined by said leg portions so that said base portion is located on one side of said sheet of material and said leg portions are located on the other side of said
   sheet of material when said bracket means engages said corner; and
   flexible line means coupling said leg portions of a first bracket means to said leg portions of a second bracket means;
   whereby when said first bracket means and said second bracket means engage respective ones of said corners, a person may lift said sheet of material by grasping said flexible line means and exerting an upward force thereupon.

2. A device as recited in claim 1 wherein
   said pair of seating surfaces are at substantially right angles to one another.

3. A device as recited in claim 2 wherein
   the free end section of each of said leg portions is bent out of said imaginary plane in a direction opposing the direction that said base portion is bent out of said imaginary plane, and said flexible line means is attached through holes formed through said bent free end sections.

4. A device as recited in claim 1 further comprising a handle means attached to said flexible line means to facilitate the grasping of said line means by the hand of a user.

5. A device for carrying sheet material comprising a pair of bracket means for engaging two corners of a sheet of material, each bracket means including:

a flat, continuous, elongated strip of material formed into a generally U-like shape having a base portion, two depending and spaced apart leg portions, and two seating portions defining a pair of seating surfaces, said two seating portions being located between said base portion and a respective one of said leg portions said base portion extending between and adjoining said two seating portions, said base portion being bent out of an imaginary plane defined be said leg portions so that said base portion is located on one side of said sheet of material and said leg portions are located on the other side of said sheet of material when said pair of bracket means engage said corners of said sheet of material, means extending between the pair of bracket means coupling the leg portions of the pair of bracket means to permit a person to lift the sheet of material.

6. A corner bracket as recited in claim 5 wherein said pair of seating surfaces are at substantially right angles to one another.

7. A corner bracket as recited in claim 6 wherein the free end sections of each of said leg portions is bent out of said imaginary plane in a direction opposing the direction that said base portion is bent out of said imaginary plane, and are each provided with a hole formed through said free end section.

* * * * *